United States Patent
Tangudu et al.

(10) Patent No.: US 10,389,195 B2
(45) Date of Patent: Aug. 20, 2019

(54) ANNULAR MAGNETS FOR ROTOR POSITION ESTIMATION

(71) Applicant: Rosemount Aerospace Inc., Burnsville, MN (US)

(72) Inventors: Jagadeesh Kumar Tangudu, South Windsor, CT (US); Andrew S. Babel, West Hartford, CT (US)

(73) Assignee: Rosemount Aerospace Inc., Burnsville, MN (US)

( * ) Notice: Subject to any disclaimer, the term of this patent is extended or adjusted under 35 U.S.C. 154(b) by 133 days.

(21) Appl. No.: 15/648,717

(22) Filed: Jul. 13, 2017

(65) Prior Publication Data

US 2019/0020234 A1    Jan. 17, 2019

(51) Int. Cl.
| | |
|---|---|
| *H02K 1/27* | (2006.01) |
| *G01B 7/30* | (2006.01) |
| *H02K 21/14* | (2006.01) |
| *H02K 21/16* | (2006.01) |
| *H02P 21/18* | (2016.01) |
| *H02K 1/24* | (2006.01) |
| *G01D 5/14* | (2006.01) |
| *G01D 5/244* | (2006.01) |

(52) U.S. Cl.
CPC ............. *H02K 1/2733* (2013.01); *G01B 7/30* (2013.01); *G01D 5/145* (2013.01); *G01D 5/24438* (2013.01); *H02K 1/246* (2013.01); *H02K 21/145* (2013.01); *H02K 21/16* (2013.01); *H02P 21/18* (2016.02)

(58) Field of Classification Search
CPC ............................... G01D 5/142; G01D 5/145
See application file for complete search history.

(56) References Cited

U.S. PATENT DOCUMENTS

| | | | |
|---|---|---|---|
| 3,112,464 A | 11/1963 | Ratajski et al. | |
| 7,859,159 B2 | 12/2010 | Ito | |
| 9,467,036 B2 | 10/2016 | Bootsma, Jr. | |
| 9,628,001 B2 | 4/2017 | Trangbaek et al. | |
| 2005/0127901 A1* | 6/2005 | Johnson | G01D 5/147 324/207.2 |

FOREIGN PATENT DOCUMENTS

| | | |
|---|---|---|
| DE | 102007020158 A1 | 12/2007 |
| DE | 102015104795 A1 | 9/2016 |
| JP | H0626808 A | 2/1994 |
| WO | WO01/55668 A1 | 8/2001 |

OTHER PUBLICATIONS

Extended European Search Report for EP Application No. 18179592.3, dated Dec. 21, 2018, 6 pages.

* cited by examiner

*Primary Examiner* — Daniel R Miller
(74) *Attorney, Agent, or Firm* — Kinney & Lange, P.A.

(57) ABSTRACT

A magnetic position sensing system includes at least one annular magnet mounted to a surface of a rotating body. The annular magnet includes a first end, a second end, an inner diameter surface, and an outer diameter surface. The inner diameter surface and outer diameter surface define a radial thickness therebetween, and the radial thickness varies from the first end to the second end.

17 Claims, 6 Drawing Sheets

ANNULAR MAGNETS FOR ROTOR POSITION ESTIMATION

BACKGROUND

Many applications involving rotating components require accurate detection of rotor position, speed, and/or direction. Typical rotor position estimation techniques include encoder, resolver, and Hall effect sensor based techniques involving placement of individual permanent magnets with alternating polarities around the circumferential surface or end surface of a shaft or other rotating body. One or more magnetic field sensors are placed within the magnetic field and can produce an output waveform for each north-south pole pair, such that the output waveform may repeat multiple times as a function of revolution of the rotor, and the number of such waveforms is a function of the number of magnetic pairs mounted on the rotor body. These waveforms, however, may not be distinguishable from one another such to provide a location of a single circumferential point. Thus, the need exists for a more accurate position estimation system that can detect discrete points along the rotor circumference at both zero speed and fixed speed.

SUMMARY

A magnetic position sensing system includes at least one annular magnet mounted to a surface of a rotating body. The annular magnet includes a first end, a second end, an inner diameter surface, and an outer diameter surface. The inner diameter surface and outer diameter surface define a radial thickness therebetween, and the radial thickness varies from the first end to the second end.

A method of making a position sensing system includes positioning at least one annular magnet on a surface of a rotating body. The annular magnet includes a first end, a second end, an inner diameter surface, and an outer diameter surface. The inner diameter surface and outer diameter surface define a radial thickness therebetween, and the radial thickness varies from the first end to the second end.

A method of estimating a position of a rotating body includes positioning at least one annular magnet on a surface of a rotating body. The annular magnet includes a first end, a second end, an inner diameter surface, and an outer diameter surface. The inner diameter surface and outer diameter surface define a radial thickness therebetween, and the radial thickness varies from the first end to the second end. The method further includes sensing, using a position sensor placed proximate the annular magnet, a magnetic flux density of the annular magnet. The magnetic flux density corresponds to the radial thickness of the annular magnet.

DETAILED DESCRIPTION

A magnetic position sensing system is described herein. The system includes one or more annular magnets attached to a shaft. The width of each annular magnet can taper axially and/or radially from one end to the other. The tapered design provides a unique magnetic flux signature at each circumferential/radial position of the magnet, which corresponds to a position of the shaft.

Figure 1:
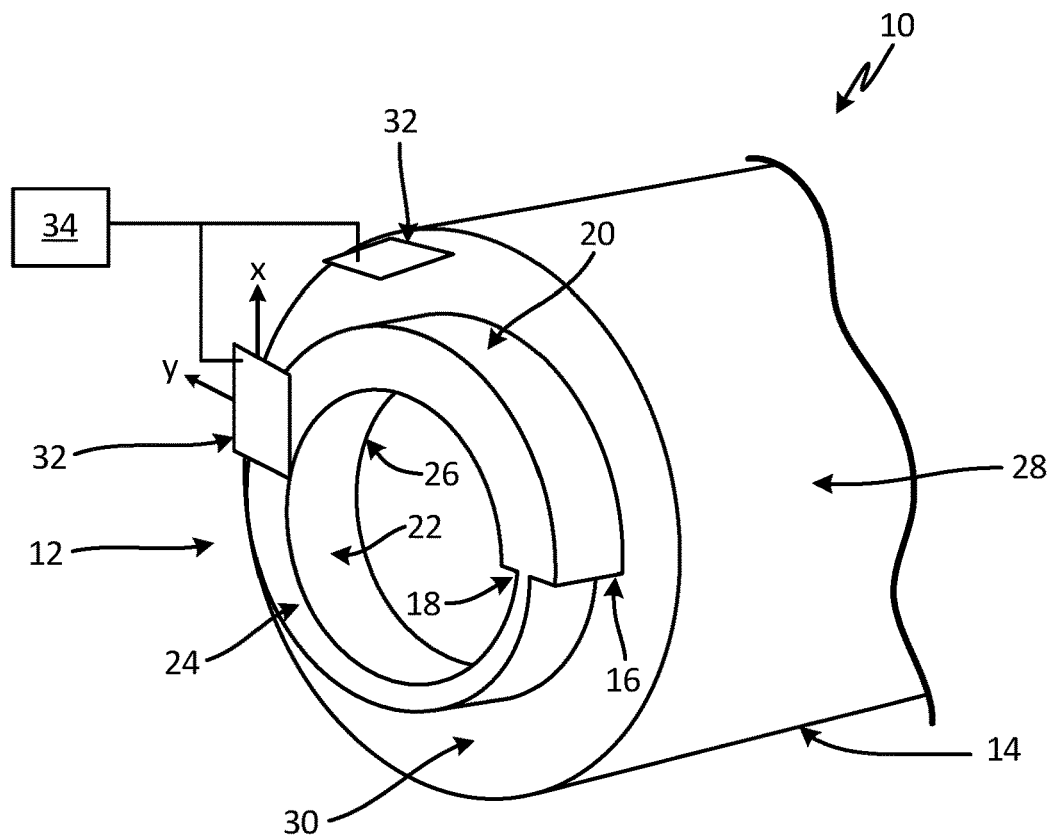
FIG. 1 is a perspective view of a magnetic position sensing system.

FIG. 1 is a perspective view of magnetic position sensing system 10. System 10 includes annular magnet 12 attached to end face 30 of shaft 14. Magnet 12 includes first end 16, second end 18, outer diameter (OD) surface 20, inner diameter (ID) surface 22, forward surface 24, and aft surface 26. Shaft 14 includes an outer diameter (OD) surface 28 and end face surface 30. In the embodiment shown in FIG. 1, annular magnet 12 is attached to end face surface 30 at aft surface 26. Magnet 12 is axially polarized such that the north pole is aligned with forward surface 24, and the south pole is aligned with aft surface 26. The polarities can be reversed in an alternative embodiment. First end 16 can abut second end 18, as shown, or the two ends 16, 18 can be spaced some distance apart.

System 10 further includes position sensors 32 placed an air gap distance from magnet 12. The air gap distance can range from sub millimeter distances to several millimeters in some embodiments, but can be more, depending on the application, as well as sensor tolerances, magnet geometry, and magnet strength. A typical sensing range of sensors 32 can be from 10 mT to 150 mT in some embodiments, and an appropriate air gap distance can be selected to avoid saturation of sensors 32 by the magnetic field. Sensors 32 can be mounted to a stationary structure (not shown in FIG. 1) proximate magnet 12 and shaft 14. In an exemplary embodiment, sensors 32 are Hall effect sensors configured to output a voltage in response to the magnetic field of magnet 12. Sensors 32 can be configured as planar structures with conducting elements along the x-y plane, and are positioned along a component of the magnetic field. Although system 10 is functional with a single sensor 32, multiple sensors 32 can be used to increase the accuracy of system 10, or to provide redundancy in the event of sensor malfunction. In the embodiment shown, each sensor 32 is configured to measure two components of the magnetic field (Bx and By, for example), but sensors 32 can also be configured to measure a single component, or configured as tri-axial (Bx, By, Bz) sensors. Sensor output signals can be provided to controller 34, as is shown in FIG. 1 schematically in communication with sensors 32.

Figure 2:
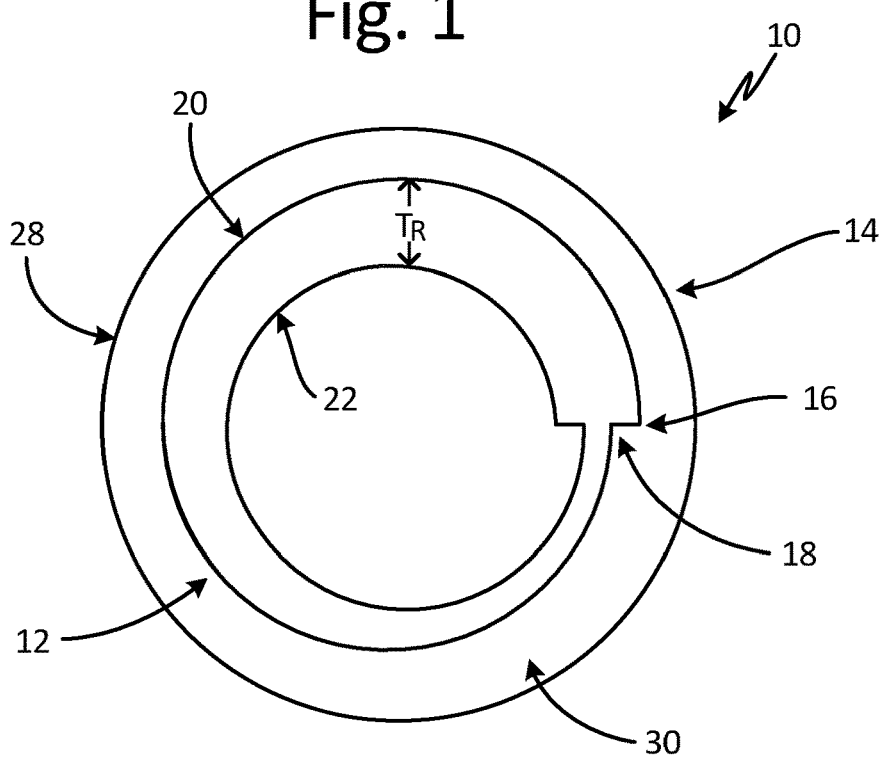
FIG. 2 is a front view of the magnetic position sensing system.

FIG. 2 is a front view of system 10 shown in FIG. 1, with sensors 32 not shown for simplicity. As can be seen in FIG. 2, annular magnet 12 has a radial thickness $T_R$, defined as extending radially outward with respect to axis A (shown in FIG. 3A), between OD surface 20 and ID surface 22. This definition of radial thickness applies to all embodiments discussed herein. In the embodiment shown, radial thickness $T_R$ tapers from first end 16 to second end 18. The thickness of magnet 12 is proportional to the magnetic flux density measured by sensors 32 (shown in FIG. 1) such that the magnetic flux density sensed by sensors 32 increases (or decreases depending on rotational direction) from 0° (first end 16) to 360° (second end 18). System 10, therefore, allows for a more precise estimation of the position of shaft 14, because each radial position has a unique flux signature. This also makes system 10 well-suited to detect the rotational direction of shaft 14. Magnet 12 can also have a varied axial thickness, which is discussed in more detail below.

Figure 3A:
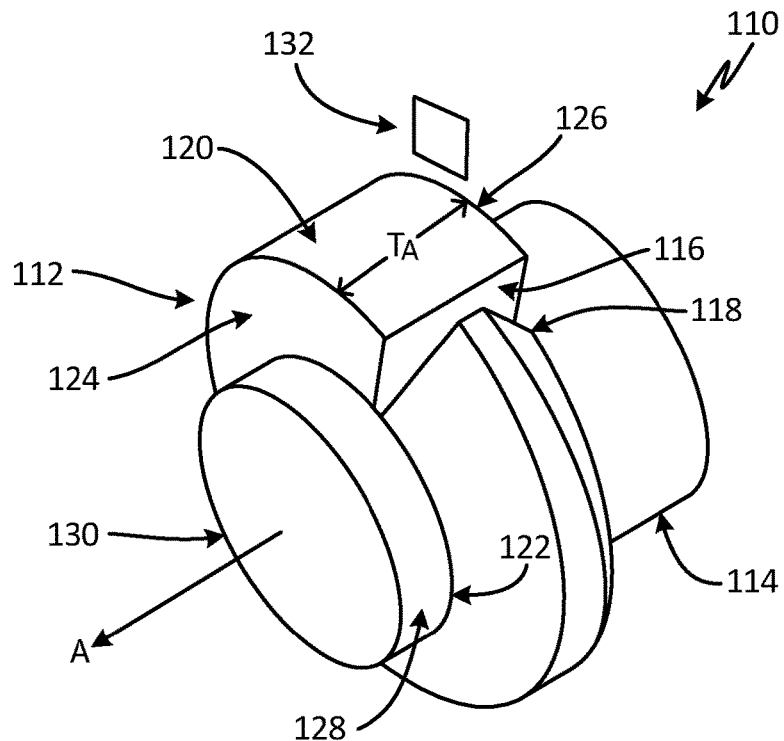
FIG. 3A is a perspective view of a first alternative magnetic position sensing system.
Figures 3B, 3C:
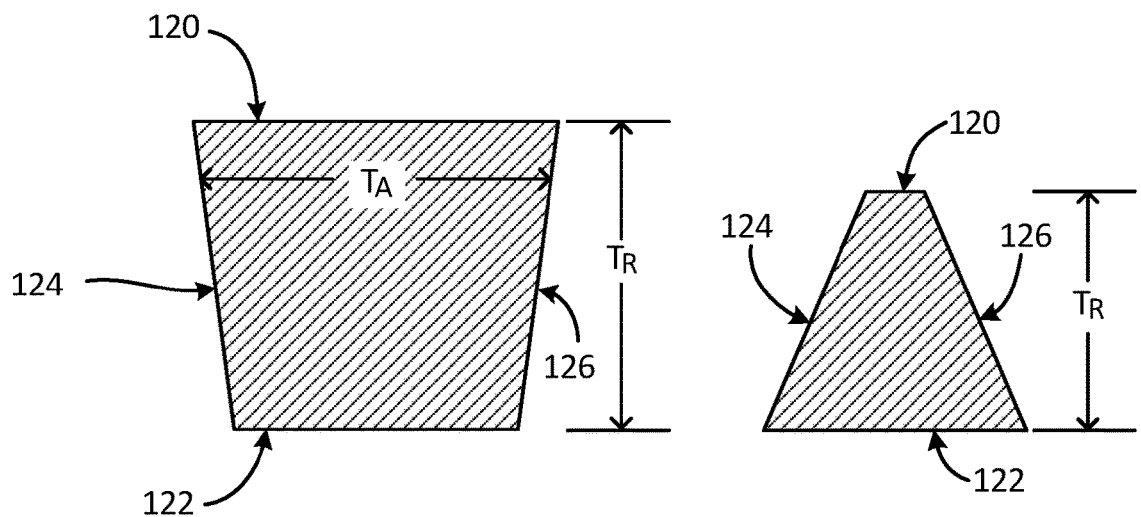
FIGS. 3B and 3C are cross-sections of an annular magnet according to the embodiment of FIG. 3A.

FIG. 3A is a perspective view of alternative system 110. In the embodiment shown in FIG. 3A, annular magnet 112 is attached to shaft 114 such that ID surface 122 contacts shaft OD surface 128. In addition to a varying thickness $T_R$ from first end 116 to second end 118, axial thickness $T_A$ also varies. For each of the embodiments discussed here, axial thickness is defined as extending along rotational axis A of shaft 114 in either direction between forward surface 124 and aft surface 126. As can be seen in FIGS. 3A-3C, axial thickness $T_A$ decreases from OD surface 120 to ID surface 122 near first end 116. Conversely, axial thickness $T_A$ increases from OD surface 120 to ID surface 122 near second end 118. This is more clearly demonstrated in FIGS. 3B and 3C, which show cross-sections of magnet 112 in the regions of first end 116 and second end 118, respectively. It can also be seen in FIGS. 3B and 3C that radial thickness $T_R$ is greater at first end 116 (FIG. 3B) than it is at second end 118 (FIG. 3C). However, in other embodiments having a varied axial thickness $T_A$, the radial thickness $T_R$ can remain constant.

The cross-sections shown in FIGS. 3B and 3C have generally trapezoidal shapes, however, in other embodiments, a cross-section of magnet 112 near second end 118 can be triangular, such that forward surface 124 and aft surface 126 meet to form a point at OD surface 120. Other potential surfaces representing 120, 124, and 126 can include semi circles, or polygonal shapes having various numbers of sides and/or rounded corners.

In the embodiment shown in FIG. 3A, magnet 112 can be radially polarized, such that the north pole is aligned with OD surface 120 and the south pole is aligned with ID surface 122, or vice versa. Sensor 132 is shown placed radially above magnet 112 to measure the resulting magnetic field. Depending on sensor design, sensor 132 can be placed with its face perpendicular to (as shown) or parallel to OD surface 120. Other embodiments can include additional sensors 132 placed at other locations radially or axially spaced an air gap distance from magnet 112.

Figure 4:
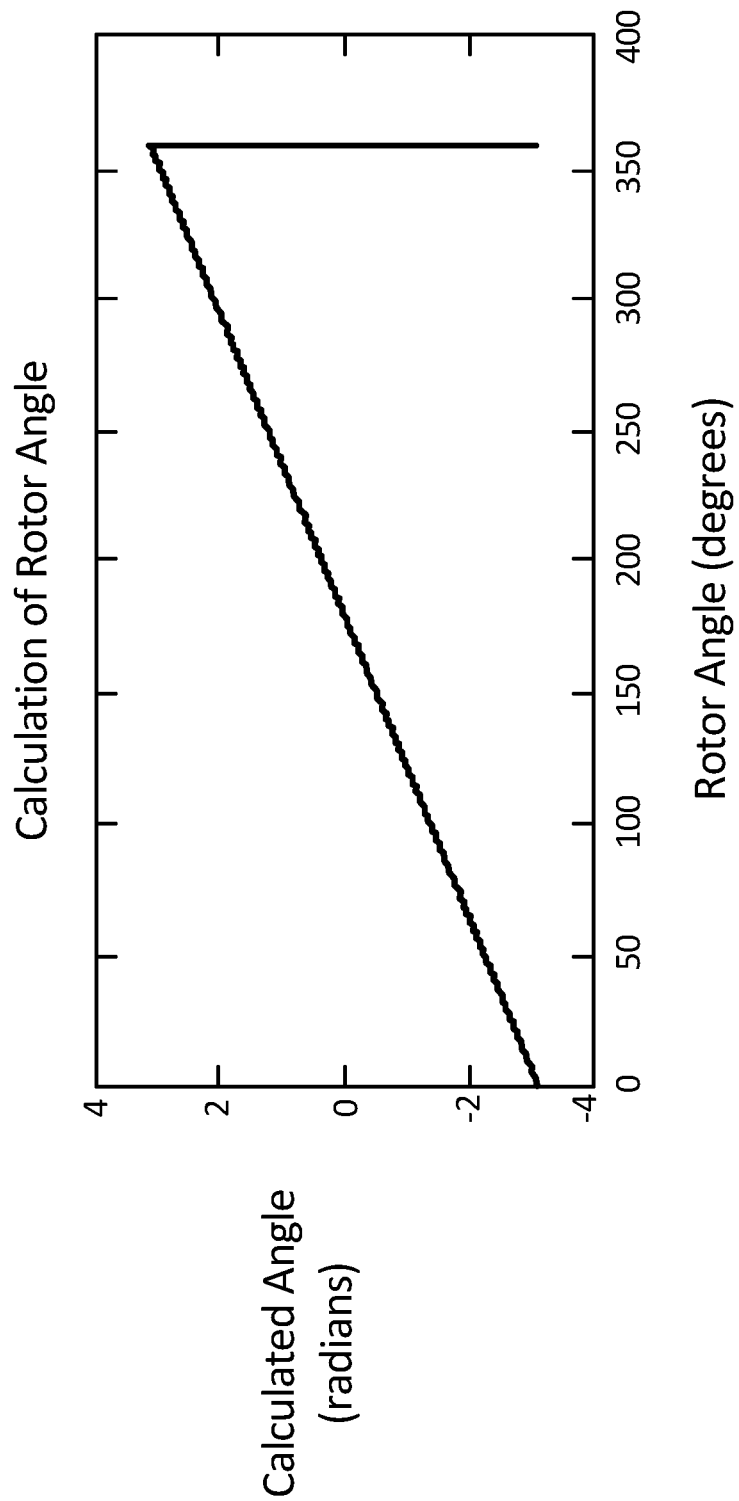
FIG. 4 is a graph representing angular signature throughout a revolution of the shaft shown in FIG. 3A.
Figure 5:
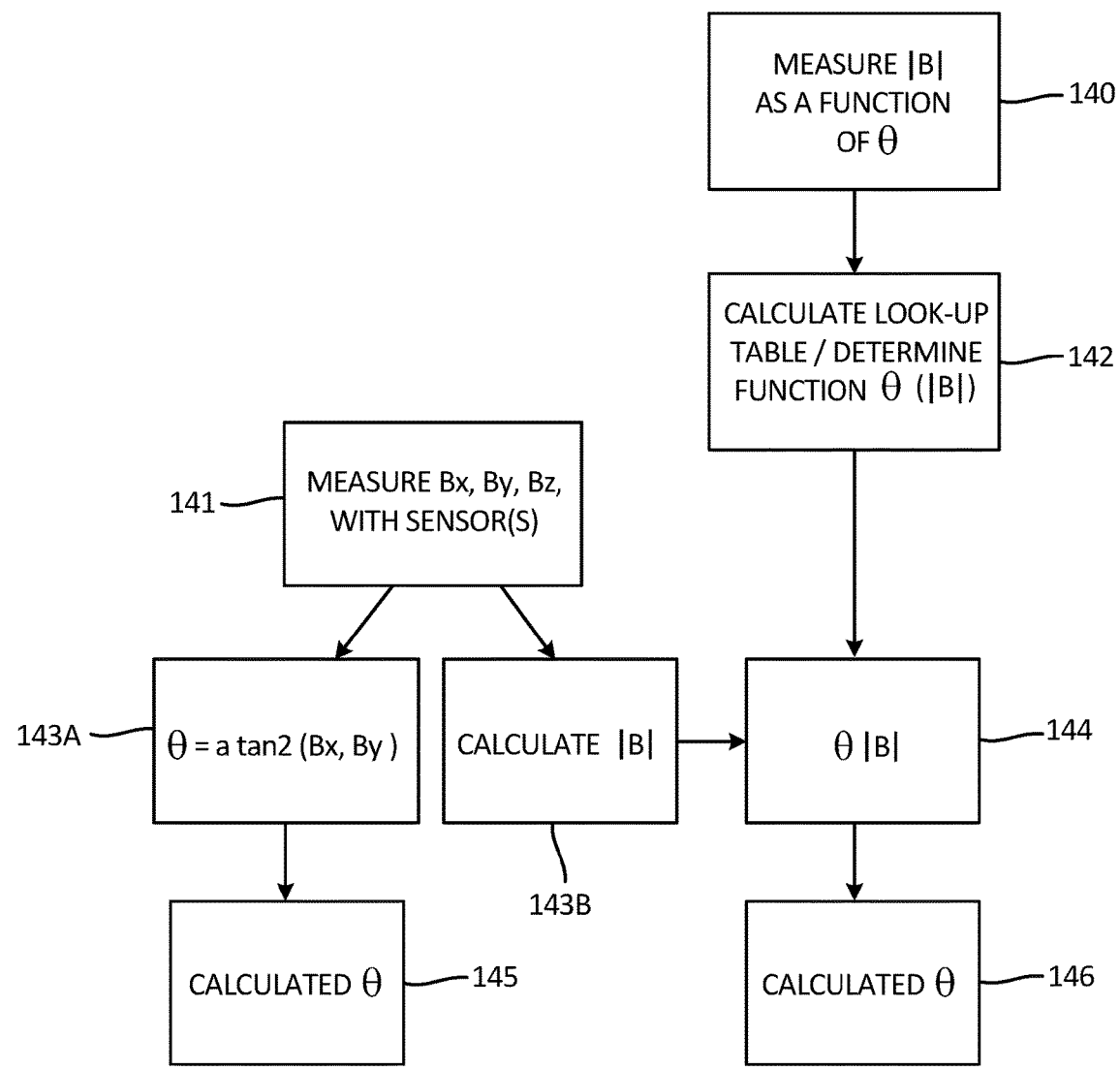
FIG. 5 is a flow chart representing steps for calculating rotor position.

FIG. 4 is a graph of the angular signature of shaft 114 during a single revolution, as measured by system 110, and calculated using an inverse tangent (or a tan 2) (θ) function. As can be seen in FIG. 4, the signature fluctuates between −π (−3.14 rad) and +π (3.14 rad) as the shaft travels 360°. If an a tan(θ) function is used, the signature can be plotted from −π/2 to +π/2. FIG. 5 shows the processes used to determine shaft position (steps 145 or 146). Following steps 140 and 142, shaft position can be determined by measuring the magnitude of the magnetic field (IBI) and using a look-up table to determine the angle θ. This approach can be useful when the shaft position is not a linear function of magnetic flux magnitude. Shaft position can also be based on the relationship of the a tan 2(θ) function and the Bx and By (and Bz, if applicable) components of the magnetic field, as is shown in steps 141 and 143A. A third method includes calculating the magnitude of the magnetic field based on the magnetic field components, and determining shaft position as a function of the magnetic field (steps 141, 143B, and 144).

Figure 6:
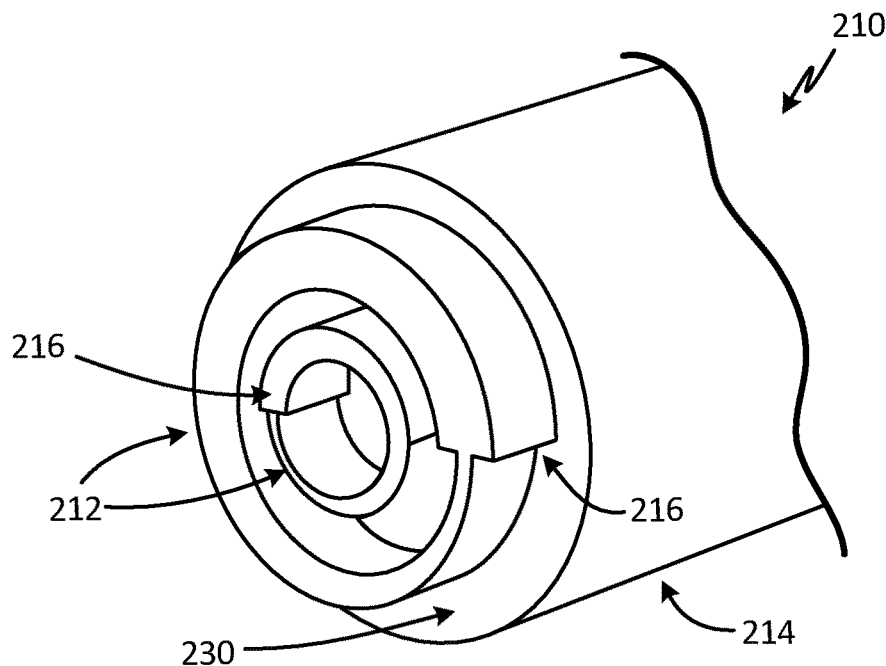
FIG. 6 is a perspective view of a second alternative magnetic position sensing system.

FIG. 6 is a perspective view of alternative system 210. In the embodiment shown in FIG. 6, system 210 includes two concentric annular magnets 212 attached to end face surface 230 of shaft 214. Both magnets 212 have a tapered geometry similar to magnets 12 and 112. As is shown in FIG. 6 first end 216 of inner magnet 212 is offset from first end 216 of outer magnet 212 by roughly 180°. In other embodiments, however, first ends 216 can be aligned, or offset by any increment from 0° to 360°, depending on the sensing application and system design.

Figure 7:
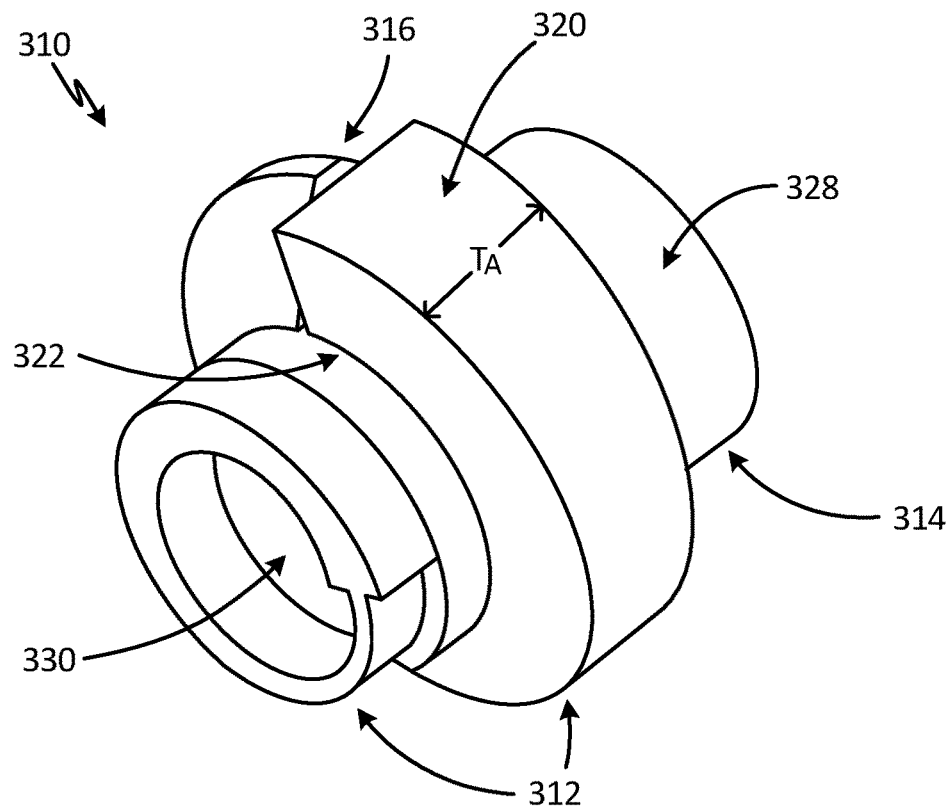
FIG. 7 is a perspective view of a third alternative magnetic position sensing system.

FIG. 7 is a perspective view of alternative system 310. In the embodiment shown in FIG. 7, system 310 includes a first magnet 312 attached to shaft 314 OD surface 328, and a second magnet 312 attached to end face surface 330 of shaft 314. As with magnets 212, first ends 316 are offset from one another, in this case, by roughly 90°. In other embodiments, first ends 316 can be aligned, or offset by any increment from 0° to 360°. FIG. 7 shows magnet 312 attached to shaft OD surface 328, where axial thickness $T_A$ increases from OD surface 320 to ID surface 322 near first end 316, while axial thickness $T_A$ decreases from OD surface 320 to ID surface 322 near second end 318. In other embodiments, magnet 312 can be designed like magnet 112 of FIG. 3A, and vice versa.

Figure 8:
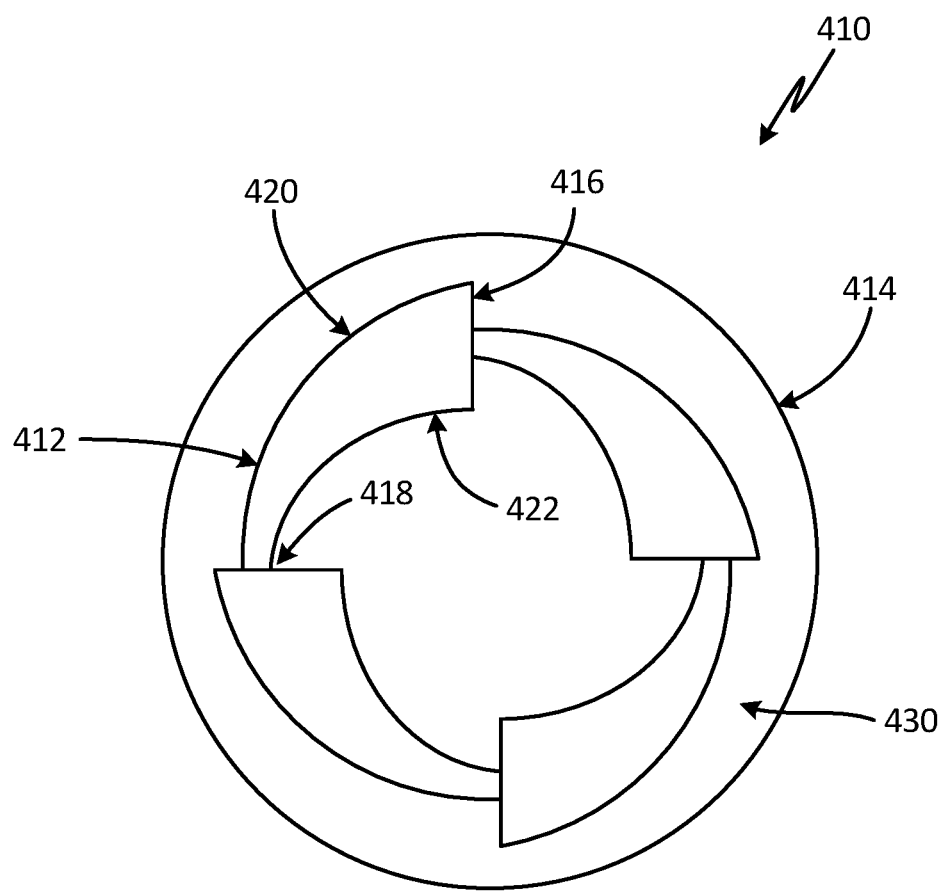
FIG. 8 is a front view of a fourth alternative position sensing system.

FIG. 8 is a front view of alternative system 410. In the embodiment shown in FIG. 8, system 410 includes a saw-blade shaped annular magnet 412. Magnet 412 includes repeated tapered segments, each having a first end 416 and a second end 418, as well as a radial thickness (not labeled in FIG. 8) that decreases from first end 416 to second end 418. Second end 418 of a segment can abut first end 416 of the adjacent segment, or the segments can be spaced some distance apart. Although magnet 412 is shown mounted to end face 430 of shaft 414, magnet 412 can be mounted elsewhere on shaft 314, and can include multiple magnets 412. Further, magnet 412 can include any number of segments depending on system design and sensing requirements.

The magnets discussed herein can be formed from a number of rare earth and non-rare earth materials. Examples include neodymium, samarium, iron, nickel, cobalt and their alloys, as well as ceramics, ferrites, and manganese bismuth. The disclosed magnets can also be formed using either traditional or additive manufacturing techniques. If traditional methods are used, the magnet can be formed by a process such as sintering or bonding prior to being attached to the shaft. If additive methods are used, the magnet can be built onto the shaft, and can be magnetized in a post-processing step. Exemplary additive manufacturing techniques can include direct-write techniques, powder bed fusion, electron beam melting (EBM), and cold spray. Other suitable traditional and additive manufacturing techniques are contemplated herein.

Since traditionally manufactured magnets are separate structures from the shaft, there is a risk that the magnets can become displaced and/or can separate from the shaft during rotation. To minimize this risk, a retention structure, such as a carbon fiber band, can be mounted around the magnet to prevent dislodging from the rotor surface. An alternative approach can include machining the rotor to include a cut-out having an inverted shape of the magnet surface mounted to the shaft, which would increase the amount of shaft surface area to which the magnet is bonded, and further secure the magnet to the shaft.

In addition to the embodiments discussed above, the position sensing systems can include three or more magnets mounted around a shaft, or to an end face of the shaft, or a combination of the two. The first ends can be aligned or offset by any increment between 0° and 360°. An alternative embodiment of the disclosed annular magnets can also include a magnet or combination of magnets comprising different shapes.

The disclosed magnetic position sensing systems have many benefits. The design of the annular magnets provides a unique magnetic flux signature that allows for a more accurate determination of the position of a rotating body. The disclosed systems also allow for the determination of rotational direction. The systems are highly customizable, as the annular magnets can be formed from a number of manufacturing techniques, and the various system components can be arranged to suit spatial, sensing, and other requirements. The disclosed systems can be used for a variety of sensing applications, including aerospace, automotive, and generally any application involving rotational components.

Discussion of Possible Embodiments

The following are non-exclusive descriptions of possible embodiments of the present invention.

A magnetic position sensing system includes at least one annular magnet mounted to a surface of a rotating body. The annular magnet includes a first end, a second end, an inner diameter surface, and an outer diameter surface. The inner diameter surface and outer diameter surface define a radial thickness therebetween, and the radial thickness varies from the first end to the second end.

The system of the preceding paragraph can optionally include, additionally and/or alternatively, any one or more of the following features, configurations and/or additional components:

The at least one annular magnet includes a forward surface and an aft surface, and an axial thickness between the forward surface and the aft surface.

The axial thickness decreases from the outer diameter surface to the inner diameter surface in a region adjacent the first end.

The axial thickness increases from the outer diameter surface to the inner diameter surface in a region adjacent the second end.

The axial thickness increases from the outer diameter surface to the inner diameter surface in a region adjacent the first end.

The axial thickness decreases from the outer diameter surface to the inner diameter surface in a region adjacent the second end.

The at least one annular magnet includes a plurality of segments, each of the segments having a first end and a second end, and a varying radial thickness between the first end and the second end.

At least one Hall effect position sensor is located proximate the annular magnet.

The at least one annular magnet is formed from a material selected from the group consisting of rare earth elements, non-rare earth elements, and combinations thereof.

The at least one annular magnet is attached to an outer diameter surface of the rotating body.

The at least one annular magnet includes a first annular magnet and second annular magnet, the second annular magnet being attached to an end face surface of the rotating body.

The first end of the first annular magnet is offset from the first end of the second annular magnet.

The at least one annular magnet is attached to an end face surface of the rotating body.

The at least one annular magnet includes a first annular magnet and a second annular magnet, the second annular magnet being attached to the end face surface of the rotating body and concentrically within the first annular magnet.

The first end of the first annular magnet is offset from the first end of the second annular magnet.

A method of making a position sensing system includes positioning at least one annular magnet on a surface of a rotating body. The annular magnet includes a first end, a second end, an inner diameter surface, and an outer diameter surface. The inner diameter surface and outer diameter surface define a radial thickness therebetween, and the radial thickness varies from the first end to the second end.

The method of the preceding paragraph can optionally include, additionally and/or alternatively, any one or more of the following features, configurations and/or additional components:

The method includes positioning at least one position sensor proximate the annular magnet.

The at least one annular magnet is attached to one of an outer diameter surface and an end face surface of the rotating body.

The at least one annular magnet includes a first annular magnet and a second annular magnet, each being attached to one of the outer diameter surface and the end face surface of the rotating body.

A method of estimating a position of a rotating body includes positioning at least one annular magnet on a surface of a rotating body. The annular magnet includes a first end, a second end, an inner diameter surface, and an outer diameter surface. The inner diameter surface and outer diameter surface define a radial thickness therebetween, and the radial thickness varies from the first end to the second end. The method further includes sensing, using a position sensor placed proximate the annular magnet, a magnetic flux density of the annular magnet. The magnetic flux density corresponds to the radial thickness of the annular magnet.

The method of the preceding paragraph can optionally include, additionally and/or alternatively, any one or more of the following features, configurations and/or additional components:

The method includes calculating the position of the rotating body based on the sensed magnetic flux density.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A magnetic position sensing system comprising:
   a first annular magnet mounted to a first surface of a rotating body;
   a second annular magnet mounted to a second surface of the rotating body, the second surface being generally perpendicular to the first surface;
   wherein each of the first and second annular magnets comprises:
      a first end;
      a second end;
      an inner diameter surface; and an outer diameter surface;

wherein the inner diameter surface and outer diameter surface define a radial thickness therebetween, the radial thickness varying from the first end to the second end.

2. The system of claim 1, wherein the at least one of the first and second annular magnets further comprises a forward surface and an aft surface, and an axial thickness between the forward surface and the aft surface.

3. The system of claim 2, wherein the axial thickness of the at least one of the first and second annular magnets decreases from the outer diameter surface to the inner diameter surface in a region adjacent the first end.

4. The system of claim 2, wherein the axial thickness of the at least one of the first and second annular magnets increases from the outer diameter surface to the inner diameter surface in a region adjacent the second end.

5. The system of claim 2, wherein the axial thickness of the at least one of the first and second annular magnets increases from the outer diameter surface to the inner diameter surface in a region adjacent the first end.

6. The system of claim 2, wherein the axial thickness of the at least one of the first and second annular magnets decreases from the outer diameter surface to the inner diameter surface in a region adjacent the second end.

7. The system of claim 1, wherein the at least one of the first and second annular magnets comprises a plurality of segments, each of the segments having a first end and a second end, and a varying radial thickness between the first end and the second end.

8. The system of claim 1 and further comprising at least one Hall effect position sensor proximate the at least one of the first and second annular magnets.

9. The system of claim 1, wherein the at least one of the first and second annular magnets is formed from a material selected from the group consisting of rare earth elements, non-rare earth elements, and combinations thereof.

10. The system of claim 1, wherein the first surface is an outer diameter surface of the rotating body.

11. The system of claim 10, wherein the second surface is an end face surface of the rotating body.

12. The system of claim 11, wherein the first end of the first annular magnet is offset from the first end of the second annular magnet.

13. A method of making a magnetic position sensing system, the method comprising:
positioning a first annular magnet on a first surface of a rotating body;
positioning a second annular magnet on a second surface of the rotating body, the second surface being generally perpendicular to the first surface;
wherein each of the first and second annular magnets comprises:
a first end;
a second end;
an inner diameter surface; and
an outer diameter surface;
wherein the inner diameter surface and outer diameter surface define a radial thickness therebetween, the radial thickness varying from the first end to the second end.

14. The method of claim 13 and further comprising: positioning at least one position sensor proximate the at least one of the first and second annular magnets.

15. The method of claim 13, wherein the first surface is an outer diameter surface of the rotating body.

16. The method of claim 13, wherein the second surface is an end face surface of the rotating body.

17. A method of estimating a position of a rotating body, the method comprising:
positioning a first annular magnet on a first surface of a rotating body;
positioning a second annular magnet on a second surface of the rotating body, the second surface being generally perpendicular to the first surface;
wherein each of the first and second annular magnets comprises:
a first end;
a second end;
an inner diameter surface; and
an outer diameter surface;
wherein the inner diameter surface and outer diameter surface define a radial thickness therebetween, the radial thickness varying from the first end to the second end;
sensing, using at least one position sensor placed proximate the at least one of the first and second annular magnets, a magnetic flux density of the at least one of the first and second annular magnets, the magnetic flux density corresponding to the radial thickness of the at least one of the first and second annular magnets; and
calculating the position of the rotating body based on the sensed magnetic flux density.

* * * * *